United States Patent
Kajimoto et al.

(10) Patent No.: US 11,101,715 B2
(45) Date of Patent: Aug. 24, 2021

(54) ROTATING ELECTRIC MACHINE AND DRIVE SYSTEM FOR ROTATING ELECTRIC MACHINE WITH HOUSING AND TERMINAL BOXES OUTSIDE THE HOUSING

(71) Applicant: KABUSHIKI KAISHA YASKAWA DENKI, Kitakyushu (JP)

(72) Inventors: Koji Kajimoto, Kitakyushu (JP); Eigo Hayashi, Kitakyushu (JP)

(73) Assignee: KABUSHIKI KAISHA YASKAWA DENKI, Kitakyushu (JP)

( * ) Notice: Subject to any disclaimer, the term of this patent is extended or adjusted under 35 U.S.C. 154(b) by 398 days.

(21) Appl. No.: 16/217,048

(22) Filed: Dec. 12, 2018

(65) Prior Publication Data

US 2019/0115801 A1    Apr. 18, 2019

Related U.S. Application Data

(63) Continuation of application No. PCT/JP2016/069558, filed on Jun. 30, 2016.

(51) Int. Cl.
*H02K 5/00*        (2006.01)
*H02K 5/22*        (2006.01)
(Continued)

(52) U.S. Cl.
CPC ............... *H02K 5/225* (2013.01); *H02K 1/16* (2013.01); *H02K 3/12* (2013.01); *H02K 11/25* (2016.01); *H02K 11/33* (2016.01); *H02K 17/12* (2013.01)

(58) Field of Classification Search
CPC ....... H02K 5/225; H02K 11/25; F25B 49/025; F24F 11/83
(Continued)

(56) References Cited

U.S. PATENT DOCUMENTS 5,912,541 A * 6/1999 Bigler .................... H02K 11/33
                                            318/600
8,299,664 B2 * 10/2012 Iwai ........................ H02K 3/522
                                            310/64
(Continued)

FOREIGN PATENT DOCUMENTS

DE          60021786       4/2006
EP          1036994 A2     9/2000
(Continued)

OTHER PUBLICATIONS

International Search Report for corresponding International Application No. PCT/JP2016/069558, dated Aug. 30, 2016.
(Continued)

*Primary Examiner* — Maged M Almawri
(74) *Attorney, Agent, or Firm* — Mori & Ward, LLP

(57) ABSTRACT

A rotating electric machine includes a housing, a stator core housed in the housing, a plurality of systems of winding groups, a plurality of first lead wires, and a plurality of terminal boxes. The plurality of systems of winding groups are arranged in the stator core and electrically connected to a plurality of power conversion devices, one system of winding group is defined as a plurality of windings electrically connected to one power conversion device. The plurality of first lead wires are electrically connected to the plurality of systems of winding groups and wired inside the housing. The plurality of terminal boxes are arranged at a plurality of places in an outer circumference of the housing, the plurality of first lead wires are distributed in a unit of the system and introduced into the plurality of terminal boxes.

16 Claims, 10 Drawing Sheets

(51) Int. Cl.
*H02K 11/25* (2016.01)
*H02K 17/12* (2006.01)
*H02K 11/33* (2016.01)
*H02K 1/16* (2006.01)
*H02K 3/12* (2006.01)

(58) Field of Classification Search
USPC .......................................................... 310/71
See application file for complete search history.

(56) References Cited

U.S. PATENT DOCUMENTS

| | | | | |
|---|---|---|---|---|
| 8,492,948 | B2* | 7/2013 | Wang | H02K 3/522 310/194 |
| 8,710,705 | B2* | 4/2014 | Yamasaki | H02K 9/22 310/68 D |
| 8,957,557 | B2* | 2/2015 | Yamasaki | H02K 9/22 310/68 D |
| 9,071,113 | B2* | 6/2015 | Abe | H02K 5/225 |
| 2002/0060105 | A1* | 5/2002 | Tominaga | B62D 5/0406 180/443 |
| 2005/0046305 | A1* | 3/2005 | Matsushita | H02K 37/125 310/257 |
| 2007/0296297 | A1* | 12/2007 | Jones | H02K 1/278 310/156.28 |
| 2008/0001106 | A1* | 1/2008 | Igarashi | H02K 29/10 250/566 |
| 2008/0018187 | A1* | 1/2008 | Yamaguchi | H02K 29/03 310/81 |
| 2008/0067884 | A1* | 3/2008 | Handwerker | H02K 11/33 310/71 |
| 2008/0084141 | A1* | 4/2008 | Schueren | H02K 5/225 310/68 B |
| 2008/0143203 | A1* | 6/2008 | Purvines | H02K 1/148 310/71 |
| 2008/0197728 | A1* | 8/2008 | Loussert | H02K 11/0141 310/71 |
| 2008/0231127 | A1* | 9/2008 | Lacaze | H02M 5/297 310/71 |
| 2009/0251015 | A1* | 10/2009 | Michel | H01R 29/00 310/71 |
| 2010/0072834 | A1* | 3/2010 | Crane | H02K 5/225 310/54 |
| 2010/0253160 | A1* | 10/2010 | Jones | H02P 5/747 310/43 |
| 2010/0327679 | A1* | 12/2010 | Fujita | H01L 25/115 310/71 |
| 2012/0098391 | A1* | 4/2012 | Yamasaki | H02K 11/33 310/68 D |
| 2012/0286604 | A1* | 11/2012 | Abe | H02K 5/225 310/71 |
| 2012/0286605 | A1* | 11/2012 | Miyachi | H02K 11/33 310/71 |
| 2013/0207491 | A1* | 8/2013 | Hatfield | H02K 7/145 310/50 |
| 2013/0241458 | A1* | 9/2013 | Soma | H02K 11/33 318/495 |
| 2018/0301959 | A1* | 10/2018 | Wettlaufer | H02K 1/14 |

FOREIGN PATENT DOCUMENTS

| | | |
|---|---|---|
| JP | 2-184242 | 7/1990 |
| JP | 7-322413 | 12/1995 |
| JP | 9-65615 | 3/1997 |
| JP | 9-131005 | 5/1997 |
| JP | 9-261940 | 10/1997 |
| JP | 2000-264048 | 9/2000 |
| JP | 2002-357182 | 12/2002 |
| JP | 2015-216714 | 12/2015 |
| WO | 1990/008419 | 7/1990 |

OTHER PUBLICATIONS

Written Opinion for corresponding International Application No. PCT/JP2016/069558, dated Aug. 30, 2016.
Japanese Office Action for corresponding JP Application No. 2018-524696, dated Nov. 5, 2019 (w/ machine translation).
Chinese Office Action for corresponding CN Application No. 201680086850.5, dated Mar. 10, 2020.
International Preliminary Report on Patentability (Chapter I) with translation of Written Opinion for corresponding International Application No. PCT/JP2016/069558, dated Jan. 10, 2019.

* cited by examiner

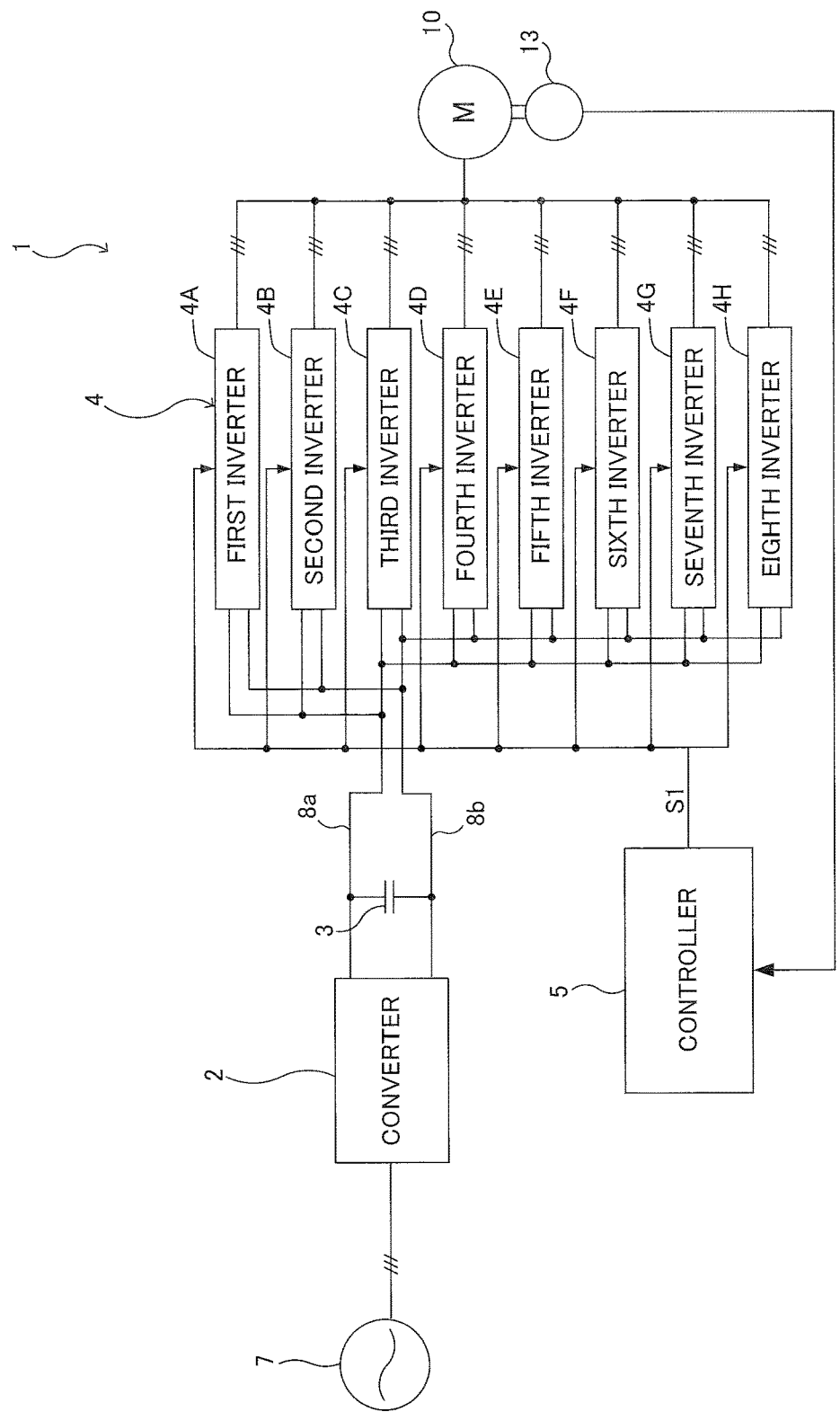
[FIG. 1]

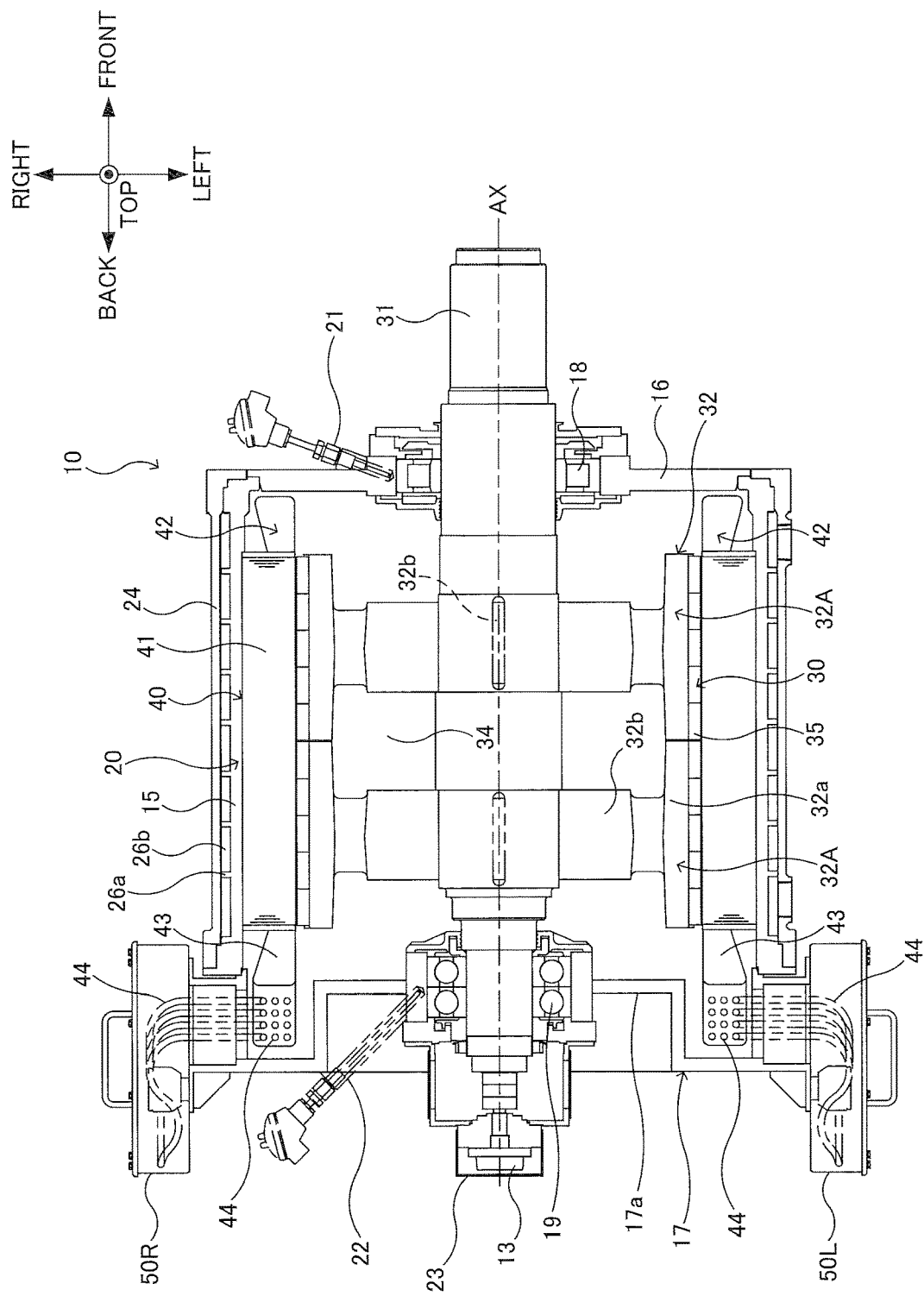
[FIG. 2]

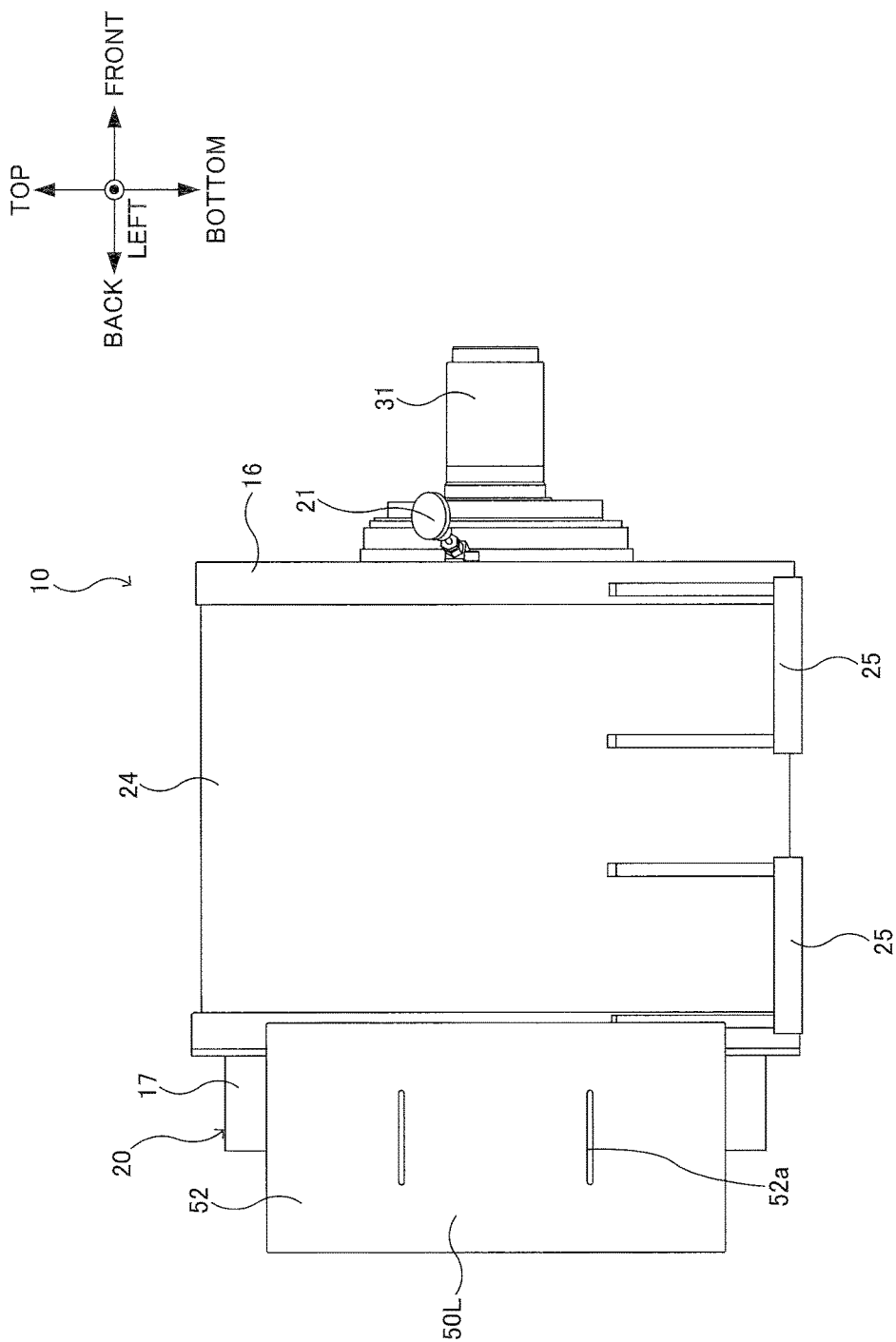
[FIG. 3]

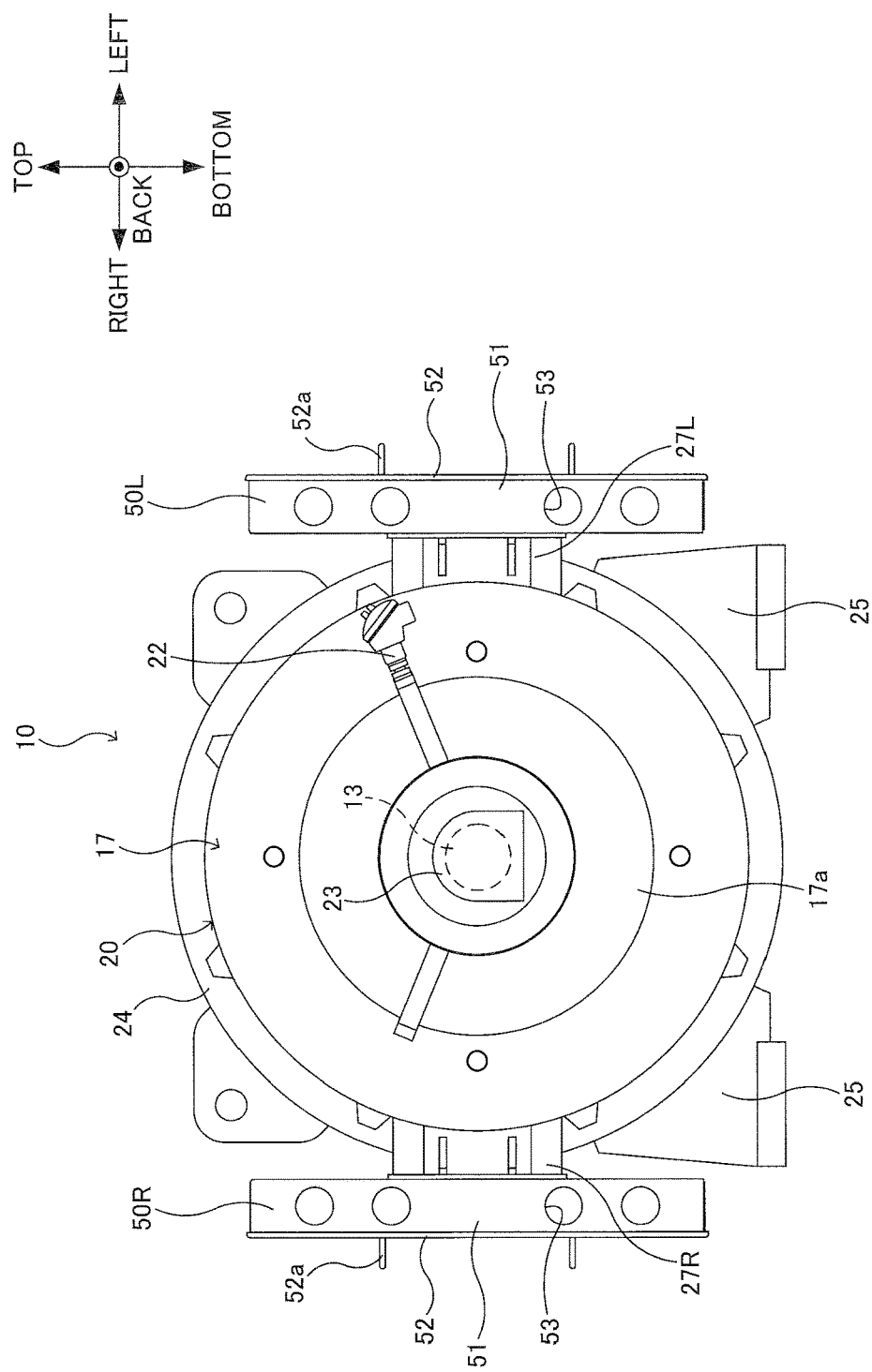
[FIG. 4]

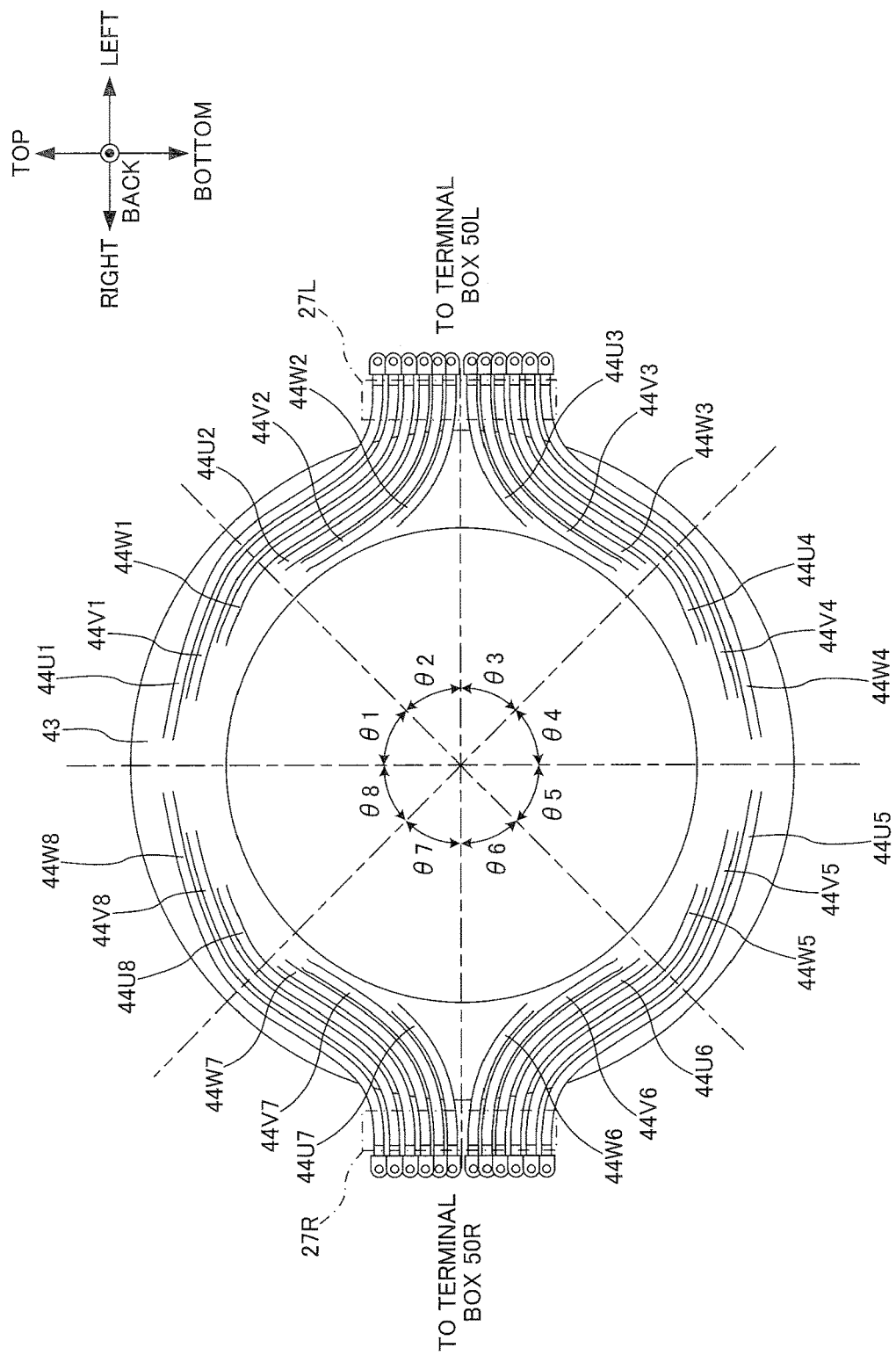
[FIG. 5]

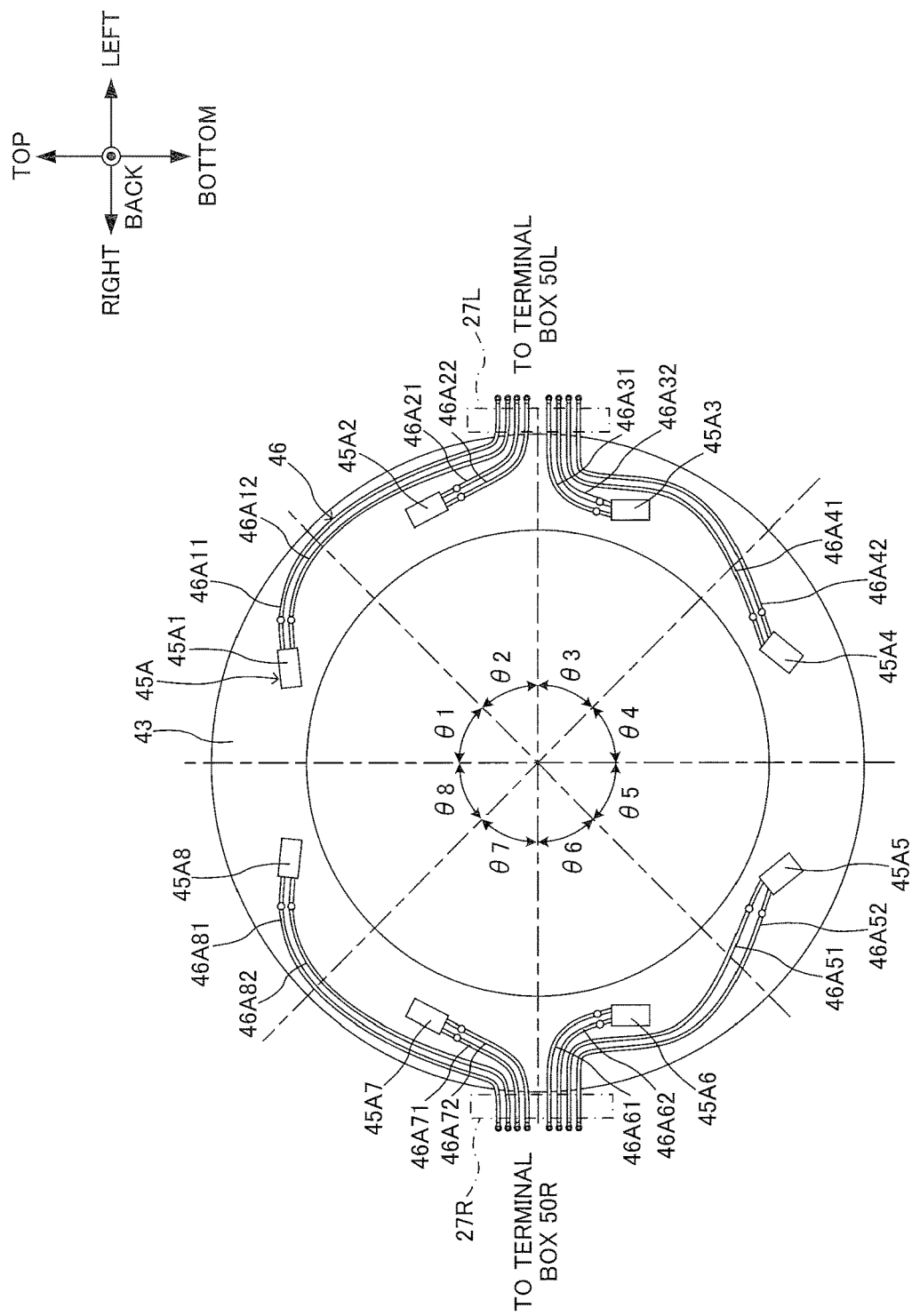
[FIG. 6]

[FIG. 7]
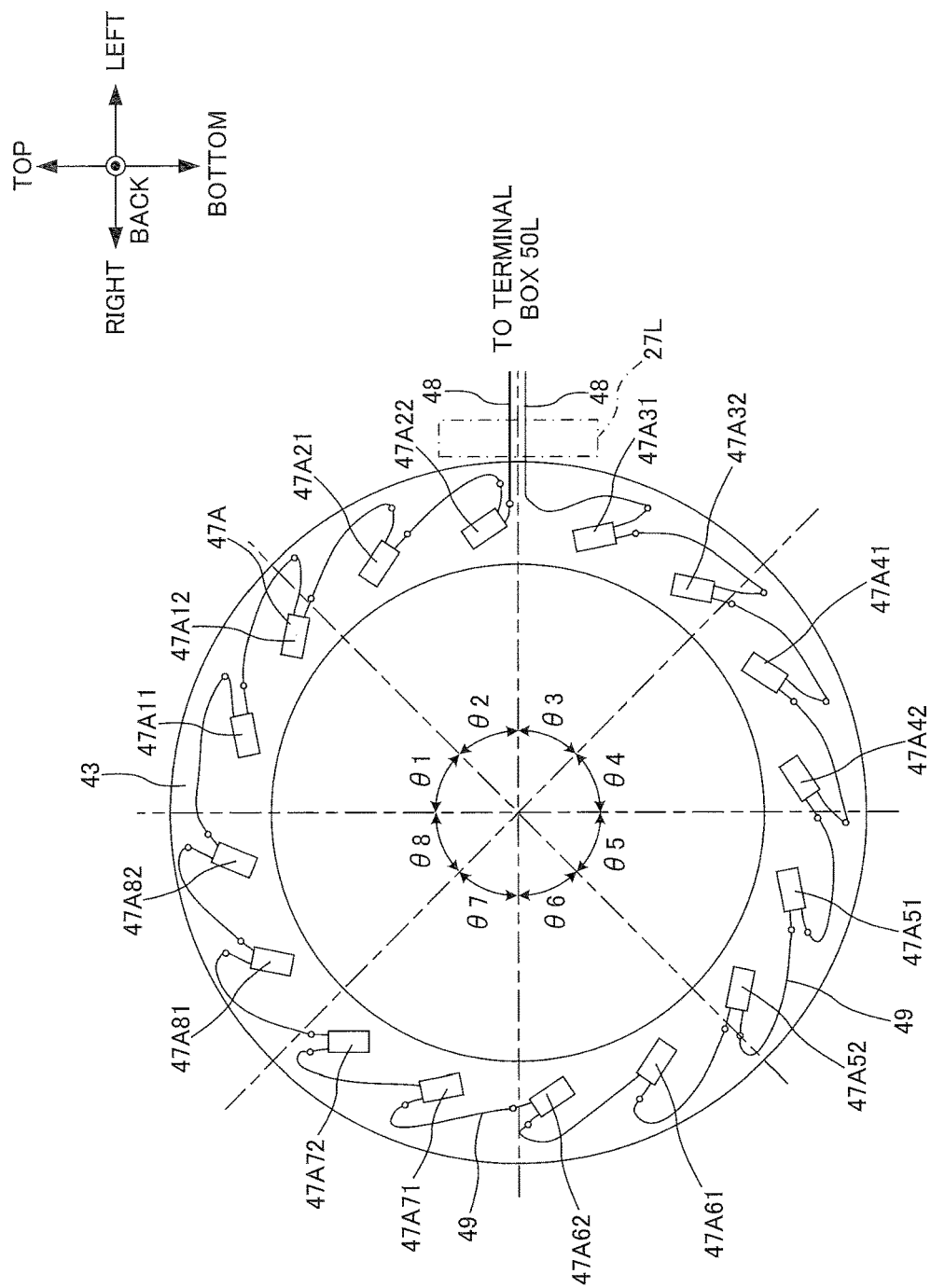

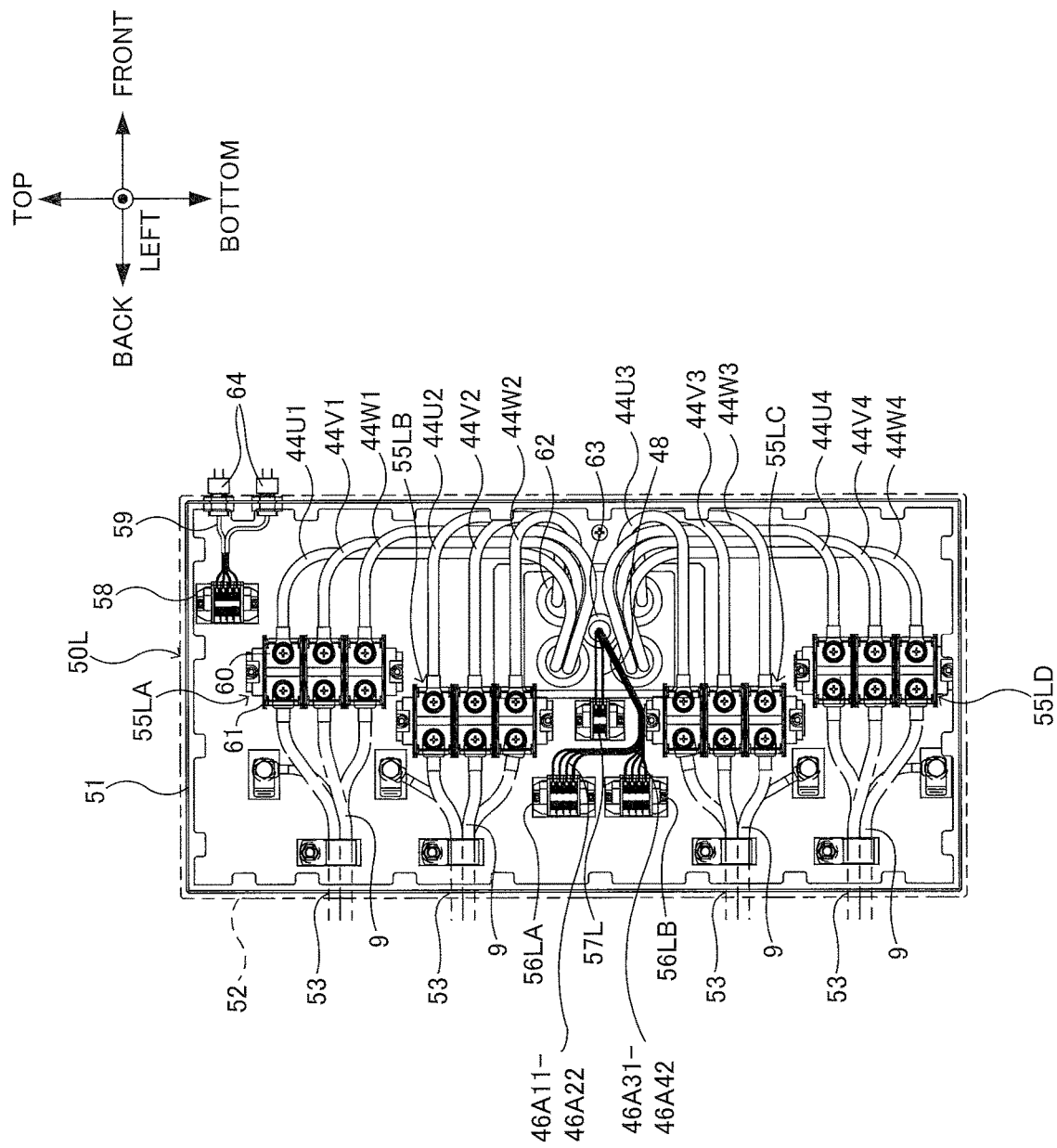
[FIG. 8]

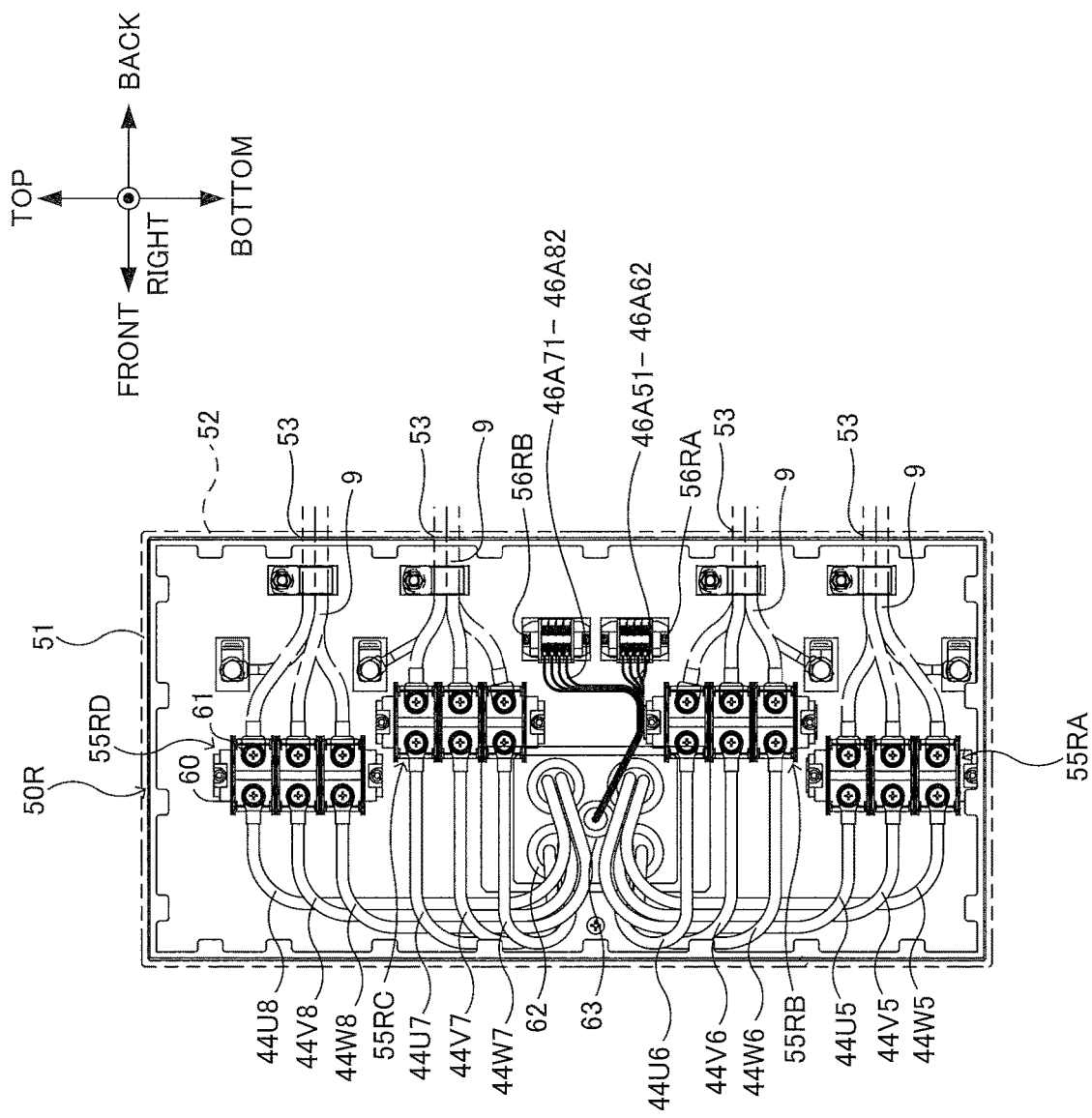
[FIG. 9]

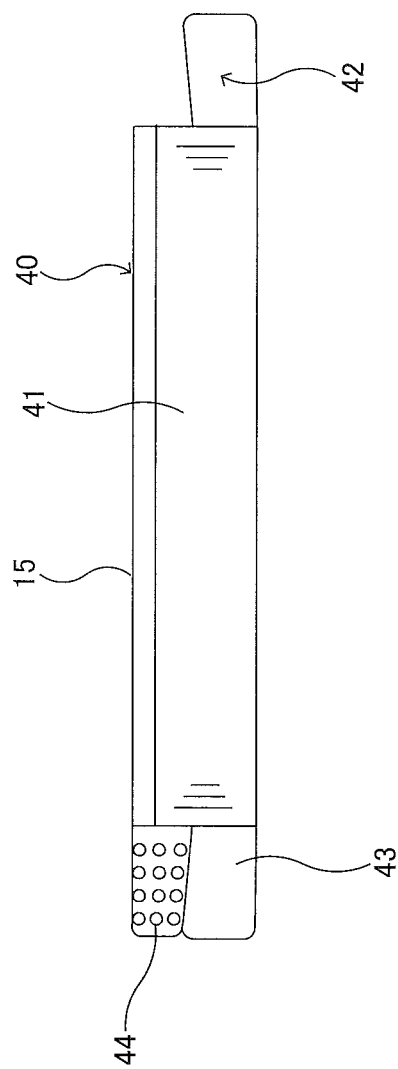
[FIG. 10]

ROTATING ELECTRIC MACHINE AND DRIVE SYSTEM FOR ROTATING ELECTRIC MACHINE WITH HOUSING AND TERMINAL BOXES OUTSIDE THE HOUSING

CROSS-REFERENCE TO RELATED APPLICATION

This is a continuation application of PCT/JP2016/069558, filed Jun. 30, 2016, which was published under PCT article 21(2). The entire contents of this application are incorporated herein by reference.

BACKGROUND OF THE INVENTION

Technical Field

A disclosed embodiment relates to a rotating electric machine and a drive system for the rotating electric machine.

Description of Background Art

There is known an induction motor, in which the plurality of lead wires extracted from the coil end are routed in a circumferential direction and are extracted toward the terminal box.

SUMMARY OF THE INVENTION

According to one aspect of the present embodiment, there is provided a rotating electric machine including a housing, a stator core housed in the housing, a plurality of systems of winding groups, a plurality of first lead wires, and a plurality of terminal boxes. The plurality of systems of winding groups are arranged in the stator core and electrically connected to a plurality of power conversion devices, one system of winding group is defined as a plurality of windings electrically connected to one power conversion device. The plurality of first lead wires are electrically connected to the plurality of systems of winding groups and wired inside the housing. The plurality of terminal boxes are arranged at a plurality of places in an outer circumference of the housing, the plurality of first lead wires are distributed in a unit of the system and introduced into the plurality of terminal boxes.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is an explanatory view illustrating an embodiment of the functional configuration of a drive system for a rotating electric machine according to one embodiment;

FIG. 2 is a horizontal sectional view in an axial direction illustrating an embodiment of the whole configuration of the rotating electric machine;

FIG. 3 is a left-side view illustrating an embodiment of the whole configuration of the rotating electric machine;

FIG. 4 is an end view on an opposite load side illustrating an embodiment of the whole configuration of the rotating electric machine;

FIG. 5 is an explanatory view illustrating an embodiment of a method for leading a first lead wire in a coil end part of a stator core;

FIG. 6 is an explanatory view illustrating an embodiment of a method for leading a second lead wire in the coil end part of the stator core;

FIG. 7 is an explanatory view illustrating an embodiment of a method for leading a third lead wire in the coil end part of the stator core;

FIG. 8 is an explanatory view illustrating an embodiment of the internal configuration of a left-side terminal box;

FIG. 9 is an explanatory view illustrating an embodiment of the internal configuration of a right-side terminal box; and FIG. 10 is an explanatory view illustrating an embodiment of the method for wiring a plurality of first lead wires in a variant.

DETAILED DESCRIPTION OF THE EMBODIMENTS

Hereinafter, an embodiment will be described with reference to the accompanying drawings.

1. Configuration of Drive System for Rotating Electric Machine

First, an embodiment of the configuration of a drive system 1 for a rotating electric machine 10 according to this embodiment will be described using FIG. 1.

As illustrated in FIG. 1, the drive system 1 includes a converter 2, a capacitor 3, a plurality of inverters 4 (4A-4H), a controller 5, and the rotating electric machine 10. The rotating electric machine 10 is used as a motor or a generator.

The converter 2 converts an AC power supplied from an AC power source 7 into a DC power. The capacitor 3 is connected between a positive-side DC bus bar 8a and negative-side DC bus bar 8b of the converter 2, and smooths the DC power converted by the converter 2. An electric double layer capacitor or the like is used as the capacitor 3, for example.

A plurality of inverters 4 (an embodiment of a power conversion device) are eight inverters: a first inverter 4A to an eighth inverter 4H, in this example. Each of the inverters 4A-4H is connected to the positive-side DC bus bar 8a and negative-side DC bus bar 8b of the converter 2, respectively, and converts the DC power smoothed by the capacitor 3 into an AC power based on a control signal S1 (PWM signal or the like) from the controller 5, and supplies this AC power to the rotating electric machine 10. Note that, the number of inverters 4 is not limited to eight, but is appropriately set depending on the capacity of the inverter 4, the capacity of the rotating electric machine 10, or the like.

The rotating electric machine 10 is the so-called multiple winding type rotating electric machine, in which one rotating electric machine is connected to a plurality of inverters. The rotating electric machine 10 includes, for each of the inverters 4A-4H, a plurality of mutually-independent systems (eight systems, in this example) of the winding groups. The winding group of each system includes a plurality of windings 42 (at least one set of three-phase windings, see FIG. 2 described later) electrically connected to one inverter.

The controller 5 (an embodiment of the control device) generates a control signal S1 based on a rotational position or the like of the rotating electric machine 10 detected by a position detector 13, and outputs the same to each of the inverters 4A-4H. Each of the inverters 4A-4H converts the DC power into an AC power based on the control signal S1 from the controller 5, and supplies this AC power to a corresponding system of winding group to drive the rotating electric machine 10. Note that the controller 5 may include a plurality of controllers.

2. Whole Configuration of Rotating Electric Machine

Next, an embodiment of the whole configuration of the rotating electric machine 10 will be described using FIG. 2 to FIG. 4. FIG. 2 is a horizontal sectional view illustrating an embodiment of the whole configuration of the rotating electric machine 10, FIG. 3 is a left-side view illustrating an embodiment of the whole configuration of the rotating electric machine 10, and FIG. 4 is a rear-face view illustrating an embodiment of the whole configuration of the rotating electric machine 10.

Note that, hereinafter for convenience of description of the configuration of the rotating electric machine and the like, the directions such as vertical, lateral, and longitudinal directions will be used as needed. The longitudinal direction shall refer to the axial direction (the direction of a rotational axis AX) of a shaft 31 of the rotating electric machine 10, the vertical direction shall refer to the perpendicular direction in the installation state of the rotating electric machine 10, and the lateral direction shall refer to the direction vertical to both the axial direction and the vertical direction. Note that these directions shall not limit the positional relationship of each configuration of the rotating electric machine or the like.

Moreover, in the followings, the "load side" refers to the direction along which a load is attached to the rotating electric machine 10, i.e., in this example the direction (forward) along which the shaft 31 protrudes, while the "opposite load side" refers to the opposite direction (backward) of the load side.

As illustrated in FIG. 2, the rotating electric machine 10 includes a rotor 30, a stator 40, a cylindrical frame 15, a load side bracket 16, an opposite load side bracket 17, and two terminal boxes 50L, 50R.

The rotor 30 includes the shaft 31, a rotor core 32 disposed on the outer circumference of the shaft 31, and a plurality of permanent magnets 35 arranged in the rotor core 32. The rotor core 32 is divided into two in the axial direction, in this example, and includes two core half-bodies 32A. Each of the core half-bodies 32A includes an outer circumferential part 32a having the permanent magnet 35 arranged on the surface thereof and a plurality of coupling parts 32b for coupling the outer circumferential part 32a and the shaft 31. The coupling part 32b is formed in a columnar shape shorter in the axial direction than the outer circumferential part 32a, and a plurality of coupling parts 32b are radially fixed in the outer circumferential part of the shaft 31. In two core half-bodies 32A, the outer circumferential parts 32a are arranged in close contact with each other or with a slight gap therebetween in the axial direction, while the coupling parts 32b are spaced apart in the axial direction. The rotor core 32 has the so-called lightened structure which has a cavity 34, for example, between the coupling parts 32b arranged side by side in the circumferential direction and between the coupling parts 32b arranged side by side in the axial direction. As a result, a reduction in weight of the rotor core 32 is achieved, and a reduction in the inertia of the rotor 30 is achieved.

The load side bracket 16 is disposed on the load side (front side) of the frame 15, while the opposite load side bracket 17 is disposed on the opposite load side (back side) of the frame 15. The frame 15, the load side bracket 16, and the opposite load side bracket 17 form a housing 20 of the rotating electric machine 10. The shaft 31 is supported rotatably about the rotational axis AX by a load side bearing 18 disposed to the load side bracket 16 and an opposite load side bearing 19 (an embodiment of the bearing) disposed to the opposite load side bracket 17. In this embodiment, the load side bearing 18 is a radial bearing. Moreover, the opposite load side bearing 19 is a pair of angular bearings, for example, which are arranged so that the supporting directions thereof in the axial direction face each other.

The opposite load side bracket 17 has, at a center part in the radial direction, a depression 17a depressed toward the load side, and the opposite load side bearing 19 is disposed to this depression 17a. As a result, at least a part of the opposite load side bearing 19, i.e., one angular bearing on the load side of a pair of angular bearings in this example, is arranged so as to be located inside the coil end part 43 on the opposite load side of the winding 42 of the stator 40 in the radial direction with respect to the rotational axis AX.

A bearing thermometer 21 for detecting the temperature of the load side bearing 18 is installed in the load side bracket 16. A bearing thermometer 22 for detecting the temperature of the opposite load side bearing 19 is installed in the opposite load side bracket 17. The position detector 13 for detecting the rotational position of the shaft 31 is attached to the opposite load side end portion of the shaft 31. The position detector 13 is an encoder, a resolver, or the like, for example, and is covered with a position detector cover 23.

In the outer circumferential surface of the frame 15, a spiral cooling passage 26b is formed by a partition 26a. A cylindrical cooling jacket 24 is attached to the outer circumference of the cooling passage 26b. A cooling medium, such as water or the like, for cooling the stator 40 is circulated from either one of the load side end part or opposite load side end part of the cooling passage 26b toward the other one. Moreover, as illustrated in FIG. 3 and FIG. 4, at the front and back positions on both the right and left sides of a lower part of the cooling jacket 24, a plurality of leg parts 25 for setting the rotating electric machine 10 to a pedestal or the like are disposed.

The stator 40 is housed in the housing 20. The stator 40 includes: a stator core 41 annularly disposed on the inner circumferential surface of the frame 15; and a plurality of windings 42 which are arranged in parallel in the circumferential direction by being housed in a non-illustrated slot of the stator core 41. The stator core 41 and the permanent magnet 35 of the rotor 30 are arranged so as to face each other in the radial direction with a magnetic gap therebetween. Inside the opposite load side bracket 17, a plurality of first lead wires 44 are bundled and wired at a position near (in this example, on the back side of) the coil end part 43 of the winding 42, the coil end part 43 protruding from the stator core 41 toward the opposite load side. One end of the first lead wire 44 is electrically connected to the coil end part 43 of the corresponding winding 42, while the other end is introduced into the corresponding terminal boxes 50L, 50R.

As illustrated in FIG. 2 and FIG. 4, the terminal boxes 50L, 50R are arranged at a plurality of places in the outer circumference of the housing 20. Specifically, the terminal boxes SOL, 50R are installed, via hollow connecting parts 27L, 27R, to positions on both sides of the housing 20 in a direction perpendicular to the axial direction, i.e., on both the left and right sides of the opposite load side bracket 17. The terminal boxes 50L, 50R are substantially rectangular parallelepiped boxes whose vertical size is longer than the longitudinal size. As illustrated in FIG. 3, the vertical size of each of the terminal boxes 50L, 50R is smaller than the vertical size of the opposite load side bracket 17. Moreover, as illustrated in FIG. 2, the terminal boxes 50L, 50R are arranged so that the axial position of the rear end part thereof substantially matches the axial position of the rear end part of the position detector cover 23. That is, the position detector cover 23 is housed in a space between the terminal boxes 50L, 50R, and is arranged so as not to protrude backward in the axial direction.

As illustrated in FIG. 4, the terminal boxes 50L, 50R each include a terminal box body 51 and a lid 52 which covers an opening part of the terminal box body 51. In the terminal box body 51 of the terminal box SOL, the left-side surface is opened, and the lid 52 is removably attached to this opened left-side surface. In the terminal box body 51 of the terminal box 50R, the right-side surface is opened, and the lid 52 is removably attached to this opened right-side surface. On the outer surface of the lid 52, a handle 52a is disposed for an operator to hold in attaching and detaching the lid 52. The first lead wire 44 and the like extracted from the inside of the opposite load side bracket 17 are introduced into the terminal boxes SOL, 50R through the connecting parts 27L, 27R, respectively. Moreover, a plurality of insertion ports 53, through which an inverter cable 9 (see FIG. 8, FIG. 9 described later) connected to each of the inverters 4A-4H is inserted, are disposed on the rear surface of the terminal box body 51 of the terminal boxes SOL, 50R.

3. Wiring Configurations of Various Types of Lead Wires in Coil End Part

Next, an embodiment of the wiring configurations of various types of lead wires in a coil end part will be described using FIG. 5 to FIG. 7.

As described above, the rotating electric machine 10 includes, for each of the inverters 4A-4H, winding groups of a plurality of mutually-independent systems (eight systems, in this example). The winding group of each system includes a plurality of windings 42 (at least one set of three-phase windings) electrically connected to one inverter. In this embodiment, the winding group of each system is arranged in a range of angles equally divided in the circumferential direction. That is, as illustrated in FIG. 5, the winding group connected to a first inverter 4A is arranged within a range of angle θ1, the winding group connected to a second inverter 4B is arranged within a range of angle θ2, the winding group connected to a third inverter 4C is arranged within a range of angle θ3, the winding group connected to a fourth inverter 4D is arranged within a range of angle θ4, the winding group connected to a fifth inverter 4E is arranged within a range of angle θ5, the winding group connected to a sixth inverter 4F is arranged within a range of angle θ6, the winding group connected to a seventh inverter 4G is arranged within a range of angle θ7, and the winding group connected to an eighth inverter 4H is arranged within a range of angle θ8, respectively.

As illustrated in FIG. 5, a plurality of first lead wires 44 connected to the winding 42 of each system of winding group are arranged in a vicinity (backward, in this example) of the coil end part 43 of the winding 42. These first lead wires 44 are wired so as to be distributed to the right and left, and are introduced into the terminal boxes 50L, 50R. Specifically, each of the first lead wires 44 is distributed to the left side and the right and wired for each unit of system toward a closer terminal box, among two terminal boxes 50L, 50R, where the distance between the corresponding coil end part 43 and connecting parts 27L, 27R is shorter.

That is, in this example, three-phase (U-phase, V-phase, W-phase) first lead wires 44U1, 44V1, and 44W1 electrically connected to the coil end part 43 of a first system of winding group to be connected to the first inverter 4A, three-phase first lead wires 44U2, 44V2, and 44W2 electrically connected to the coil end part 43 of a second system of winding group to be connected to the second inverter 4B, three-phase first lead wires 44U3, 44V3, and 44W3 electrically connected to the coil end part 43 of a third system of winding group to be connected to the third inverter 4C, and three-phase first lead wires 44U4, 44V4, and 44W4 electrically connected to the coil end part 43 of a fourth system of winding group to be connected to the fourth inverter 4D are wired toward the left side along the circumferential direction of the coil end part 43 and introduced into the terminal box SOL via the connecting part 27L.

Moreover, three-phase first lead wires 44U5, 44V5, and 44W5 electrically connected to the coil end part 43 of a fifth system of winding group to be connected to the fifth inverter 4E, three-phase first lead wires 44U6, 44V6, and 44W6 electrically connected to the coil end part 43 of a sixth system of winding group to be connected to the sixth inverter 4F, three-phase first lead wires 44U7, 44V7, and 44W7 electrically connected to the coil end part 43 of a seventh system of winding group to be connected to the seventh inverter 4G, and three-phase first lead wires 44U8, 44V8, and 44W8 electrically connected to the coil end part 43 of an eighth system of winding group to be connected to the eighth inverter 4H are wired toward the right side along the circumferential direction of the coil end part 43 and introduced into the terminal box 50R via the connecting part 27R.

As illustrated in FIG. 6, a plurality of thermistors 45A (an embodiment of a first temperature sensor) for detecting the heat (temperature change) of the winding 42 are disposed to the coil end part 43 of the winding 42. One thermistor 45A is disposed respectively for one system: i.e., a thermistor 45A1 for the first system, a thermistor 45A2 for the second system, a thermistor 45A3 for the third system, a thermistor 45A4 for the fourth system, a thermistor 45A5 for the fifth system, a thermistor 45A6 for the sixth system, a thermistor 45A7 for the seventh system, and a thermistor 45A8 for the eighth system are disposed. Each thermistor 45A (45A1-45A8) is installed between phases of the three-phase windings 42, i.e., between the U-phase winding 42 and the V-phase winding 42, between the V-phase winding 42 and the W-phase winding 42, or between the W-phase winding 42 and the U-phase winding 42.

Two second lead wires 46A are connected to each thermistor 45A, respectively. These second lead wires 46A are wired so as to be distributed to the right and left, and are introduced into the terminal boxes 50L, 50R, as with the first lead wiring 44. Specifically, each of the second lead wires 46A is distributed to the left side and the right and wired toward a terminal box, among two terminal boxes 50L, 50R, where the distance between the corresponding thermistor 45A and connecting parts 27L, 27R is shorter.

That is, in this example, second lead wires 46A11, 46A12 connected to the thermistor 45A1 for the first system, second lead wires 46A21, 46A22 connected to the thermistor 45A2 for the second system, second lead wires 46A31, 46A32 connected to the thermistor 45A3 for the third system, and second lead wires 46A41, 46A42 connected to the thermistor 45A4 for the fourth system are wired toward the left side along the circumferential direction of the coil end part 43 and introduced into the terminal box SOL via the connecting part 27L.

Moreover, second lead wires 46A51, 46A52 connected to the thermistor 45A5 for the fifth system, second lead wires 46A61, 46A62 connected to the thermistor 45A6 for the sixth system, second lead wires 46A71, 46A72 connected to the thermistor 45A7 for the seventh system, and second lead wires 46A81, 46A82 connected to the thermistor 45A8 for the eighth system are wired toward the right side along the circumferential direction of the coil end part 43 and introduced into the terminal box 50R via the connecting part 27R.

As illustrated in FIG. 7, to the coil end part 43 of the winding 42, a plurality of thermostats 47A (an embodiment of a second temperature sensor) are disposed, which shuts the conduction of the third lead wire 48 in the case that it detects the heat (temperature change) of the winding 42 and the heat satisfies a predetermined condition (for example, in the case that the temperature exceeds a predetermined temperature). Two thermostats 47 are disposed respectively for one systems: i.e., thermostats 47A11, 47A12 for the first system, thermostats 47A21, 47A22 for the second system, thermostats 47A31, 47A32 for the third system, thermostats 47A41, 47A42 for the fourth system, and thermostat 47A51, 47A52 for the fifth system, thermostats 47A61, 47A62 for the sixth system, thermostats 47A71, 47A72 for the seventh system, and thermostats 47A81, 47A82 for the eighth system are disposed. Each thermostat 47A (47A11-47A82) is installed between phases of the three-phase windings 42, i.e., between the U-phase winding 42 and the V-phase winding 42, between the V-phase winding 42 and the W-phase winding 42, or between the W-phase winding 42 and the U-phase winding 42.

A plurality of thermostats 47A are connected in series with each other along the circumferential direction of the coil end part 43 via the connection lead wire 49, and two third lead wires 48 are connected to the both ends of these plurality of thermostats 47A (thermostats 47A22, 47A31, in this example). These two third lead wires 48 are introduced into one of the terminal boxes 50L, 50R (the terminal box 50L in this example) via the connecting part 27L. Note that the third lead wire 48 may be introduced into the terminal box 50R.

4. Internal Configuration of Terminal Box

Next, an embodiment of the internal configuration of the terminal boxes 50L, 50R is described using FIG. 8 and FIG. 9.

As illustrated in FIG. 8, the terminal box 50L on the left side includes: a plurality of (four, in this example) terminal blocks 55L (i.e., terminal blocks 55LA-55LD), to which a plurality of first lead wires 44 are connected for each system; two terminal blocks 56LA, 56LB for the thermistor 45A; one terminal block 57L for the thermostat 47A; and one terminal block 58 for the bearing thermometer.

The first to fourth terminal blocks 55LA-55LD for the first lead wire 44 are arranged in order from top to bottom along the vertical direction near a center part in the width direction (longitudinal direction) of the terminal box body 51. More specifically, the first terminal block 55LA and the fourth terminal block 55LD are arranged near the front side in the width direction of the terminal box body 51, while the second terminal block 55LB and the third terminal block 55LC are arranged near the back side in the width direction of the terminal box body 51. As a result, the first terminal block 55LA and the second terminal block 55LB are alternately shifted by a specified amount in the longitudinal direction (rotational axis direction), and are arranged so that at least parts thereof overlap with each other in the vertical direction. Similarly, the third terminal block 55LC and the fourth terminal block 55LD are alternately shifted by a specified amount in the longitudinal direction, and are arranged so that at least parts thereof overlap with each other in the vertical direction. Each of the terminal blocks 55LA-55LD includes, on the front side, one column of three terminal boards 60 for the three-phase first lead wires 44, and includes, on the back side, one column of three terminal boards 61 for the three-phase inverter cables 9.

The second terminal block 55LB and the third terminal block 55LC are spaced apart in the vertical direction. A terminal block 57L for the thermostats is arranged between these terminal blocks 55LB, 55LC. Moreover, at a backward position of the terminal block 57L, i.e., at a backward position between the terminal blocks 55LB, 55LC, the terminal boxes 56LA, 56LB for thermistors are disposed in one column in the vertical direction. The second terminal block 55LB and the terminal block 56LA are arranged with a specified amount of shift in the longitudinal direction, and the terminal block 56LB and the third terminal block 55LC are arranged with a specified amount of shift in the longitudinal direction. The second terminal block 55LB and the terminal block 56LA are arranged so that at least parts thereof overlap with each other in the vertical direction, and the terminal block 56LB and the third terminal block 55LC are arranged at least parts thereof overlap with each other in the vertical direction.

The terminal block 58 for the bearing thermometer is arranged at a position near the front side of the upper end of the terminal box body 51. The terminal block 58 for the bearing thermometer and the first terminal block 55LA are arranged with a specified amount of shift in the longitudinal direction, and are arranged so that at least parts thereof overlap with each other in the vertical direction.

At a forward position of the terminal block 57L (i.e., at a forward position between the terminal boxes 55LB, 55LC), four annular rubber bushes 62 and one annular rubber bush 63 which is arranged so as to be located at the center of four rubber bushes 62 and smaller than the rubber bush 62 are disposed. The first to fourth systems of first lead wires 44 extracted from the opposite load side bracket 17 are sorted for each system by four rubber bushes 62 through the connecting part 27L, and are introduced into the terminal box body 51 and connected to the corresponding terminal blocks 55LA-55LD. Specifically, the first system of first lead wires 44U1, 44V1, and 44W1 are introduced into the first terminal block 55LA through the rubber bush 62 (the rubber bush 62 near backward on the upper-side, in this example) corresponding to the first system, and are screwed to three terminal boards 60 of the terminal block 55LA. The second system of first lead wires 44U2, 44V2, and 44W2 are introduced into the second terminal block 55LB through the rubber bush 62 (the rubber bush 62 near forward on the upper-side, in this example) corresponding to the second system, and are screwed to three terminal boards 60 of the terminal block 55LB. The third system of first lead wires 44U3, 44V3, and 44W3 are introduced into the third terminal block 55LC through the rubber bush 62 (the rubber bush 62 near forward on the lower-side, in this example) corresponding to the third system, and are screwed to three terminal boards 60 of the terminal block 55LC. The fourth system of first lead wires 44U4, 44V4, and 44W4 are introduced into the fourth terminal block 55LD through the rubber bush 62 (the rubber bush 62 near backward on the lower-side, in this example) corresponding to the fourth system, and are screwed to three terminal boards 60 of the terminal block 55LD.

Into the terminal box 50L, a plurality of inverter cables 9 connected to the first to fourth inverters 4A-4D among the first to eighth inverters 4A-4H are introduced through a plurality of insertion ports 53 in the rear surface of the terminal box body 51. A plurality of inverter cables 9 are introduced into the terminal blocks 55LA-55LD, respectively, and are screwed to three terminal boards 61 of each of the terminal blocks 55LA-55LD. As a result, the first to fourth systems of winding groups of the rotating electric machine 10 are electrically connected to the first to fourth inverters 4A-4D, respectively.

Eight second lead wires 46A (46A11-46A42) for the thermistors 45A (45A1-45A4) used for the first to fourth systems extracted from the opposite load side bracket 17 and two third lead wires 48 are introduced into the terminal box body 51 from the rubber bush 63 through the connecting part 27L. Then, four second lead wires 46A11-46A22 for the first and second systems are fixed to four terminal connection parts of the terminal block 56LA. Four second lead wires 46A31-46A42 for the third and fourth systems are similarly fixed to four terminal connection parts of the terminal block 56LB. On the other hand, two third lead wires 48 are fixed to two terminal connection parts of the terminal block 57L.

Non-illustrated two lead wires connected to each of the bearing thermometer 21 on the load side and the bearing thermometer 22 on the opposite load side are routed outside the cooling jacket 24 to the terminal box 50L. Then, two lead wires are connected to two terminal leading-in lead parts 64 disposed to the front upper part of the terminal box body 51, respectively. Each of the terminal leading-in lead parts 64 is connected to the terminal block 58 for the bearing thermometer via a lead wire 59.

As illustrated in FIG. 9, the terminal box 50R on the right side includes: a plurality of (four, in this example) terminal blocks 55R (i.e., terminal blocks 55RA-55RD) to which a plurality of first lead wires 44 are connected for each system; and two terminal blocks 56RA, 56RB for the thermistor 45A. Unlike the terminal box 50L, a terminal block for the thermostat and the terminal block for the bearing thermometer are not disposed to the terminal box 50R. However, these terminal blocks may be disposed to the terminal box 50R instead of the terminal box 50L.

The fifth to eighth terminal blocks 55RA-55RD for the first lead wire 44 are arranged in order from bottom to top along the vertical direction near a center part in the width direction (longitudinal direction) of the terminal box body 51. More specifically, the fifth terminal block 55RA and the eighth terminal block 55RD are arranged near the front side in the width direction of the terminal box body 51, while the sixth terminal block 55RB and the seventh terminal block 55RC are arranged near the back side in the width direction of the terminal box body 51. As a result, the fifth terminal block 55RA and the sixth terminal block 55RB are alternately shifted by a specified amount in the longitudinal direction (rotational axis direction), and are arranged so that at least parts thereof overlap with each other in the vertical direction. Similarly, the seventh terminal block 55RC and the eighth terminal block 55RD are alternately shifted by a specified amount in the longitudinal direction, and are arranged so that at least parts thereof overlap with each other in the vertical direction. Each of the terminal blocks 55RA-55RD includes, on the front side, one column of three terminal boards 60 for the three-phase first lead wires 44, and includes, on the back side, one column of three terminal boards 61 for the three-phase inverter cables 9.

The sixth terminal block 55RB and the seventh terminal block 55RC are spaced apart in the vertical direction. At a backward position of these terminal blocks 55RB, 55RC, the terminal boxes 56RA, 56RB for the thermistors are disposed in one column in the vertical direction. The sixth terminal block 55RB and the terminal block 56RA are shifted by a specified amount in the longitudinal direction, and the terminal block 56RB and the seventh terminal block 55RC are shifted by a specified amount in the longitudinal direction. The sixth terminal block 55RB and the terminal block 56RA are arranged so that at least parts thereof overlap with each other in the vertical direction, and the terminal block 56RB and the seventh terminal block 55RC are arranged so that at least parts thereof overlap with each other in the vertical direction.

At a forward position between the terminal blocks 55RB, 55RC, four annular rubber bushes 62 and one annular rubber bush 63 which is arranged so as to be located at the center of four rubber bushes 62 and smaller than the rubber bush 62 are disposed. The fifth to eighth systems of first lead wires 44 extracted from the opposite load side bracket 17 are sorted for each system by four rubber bushes 62 through the connecting part 27R, and are introduced into the terminal box body 51 and connected to the corresponding terminal blocks 55RA-55RD. Specifically, the fifth system of first lead wires 44U5, 44V5, and 44W5 are introduced into the fifth terminal block 55RA through the rubber bush 62 (the rubber bush 62 near backward on the lower-side, in this example) corresponding to the fifth system, and are screwed to three terminal boards 60 of the terminal block 55RA. The sixth system of first lead wires 44U6, 44V6, and 44W6 are introduced into the sixth terminal block 55RB through the rubber bush 62 (the rubber bush 62 near forward on the lower-side, in this example) corresponding to the sixth system, and are screwed to three terminal boards 60 of the terminal block 55RB. The seventh system of first lead wires 44U7, 44V7, and 44W7 are introduced into the seventh terminal block 55RC through the rubber bush 62 (the rubber bush 62 near forward on the upper-side, in this example) corresponding to the seventh system, and are screwed to three terminal boards 60 of the terminal block 55RC. The eighth system of first lead wires 44U8, 44V8, and 44W8 are introduced into the eighth terminal block 55RD through the rubber bush 62 (the rubber bush 62 near backward on the upper-side, in this example) corresponding to the eighth system, and are screwed to three terminal boards 60 of the terminal block 55RD.

Into the terminal box 50R, a plurality of inverter cables 9 connected to the fifth to eighth inverters 4E-4I1 among the first to eighth inverters 4A-4H are introduced through a plurality of insertion ports 53 in the rear surface of the terminal box body 51. A plurality of inverter cables 9 are introduced into the terminal blocks 55RA-55RD, respectively, and are screwed to three terminal boards 61 of each of the terminal blocks 55RA-55RD. As a result, the fifth to eighth systems of winding groups of the rotating electric machine 10 are electrically connected to the fifth to eighth inverters 4E-4H, respectively.

Eight second lead wires 46A (46A51-46A82) for the thermistors 45A (45A5-45A8) used for the fifth to eighth systems extracted from the opposite load side bracket 17 are introduced into the terminal box body 51 from the rubber bush 63 through the connecting part 27R. Then, four second lead wires 46A51-46A62 used for the fifth and sixth systems are fixed to four terminal connection parts of the terminal block 56LA. Four second lead wires 46A71-46A82 used for the seventh and eighth systems are similarly fixed to four terminal connection parts of the terminal block 56RB.

In the above, the wiring configuration of the first lead wire 44, the connecting parts 27L, 27R, and the terminal boxes 50L, 50R correspond to an embodiment of the means for distributing, in the unit of system, a plurality of first lead wires wired inside the housing and leading out the same to the outside of the housing.

5. Effects of Embodiment

As described above, the rotating electric machine 10 of this embodiment includes: the housing 20; the stator core 41 housed in the housing 20; a plurality of systems of winding groups arranged in the stator core 41 and electrically connected to a plurality of inverters 4A-4H, one system of winding group being defined as a plurality of windings 42 electrically connected to one inverter 4; a plurality of first lead wires 44 electrically connected to the plurality of systems of winding groups and wired inside the housing 20; and a plurality of terminal boxes 50L, 50R arranged at a plurality of places in an outer circumference of the housing 20, the plurality of first lead wires 44 being distributed in the unit of system and introduced into the plurality of terminal boxes 50L, 50R. As a result, the following effects are obtained.

That is, the rotating electric machine 10 of this embodiment is the so-called multiple-winding type rotating electric machine, in which one rotating electric machine is electrically connected to a plurality of inverters 4. The multiple-winding type rotating electric machine includes a plurality of systems of winding groups mutually independent for each inverter 4. Each system of winding group includes a plurality of windings 42 (at least one set of three-phase windings) electrically connected to one inverter 4. Therefore, the a large number of winding 42 will be provided and a large number of first lead wires 44 will be wired inside the housing 20, resulting in an increase in the wiring space.

In this embodiment, the terminal boxes 50L, 50R are arranged at two places in the outer circumference of the housing 20, and a plurality of first lead wires 44 are distributed in the unit of system and introduced into each of the terminal boxes 50L, 50R. As a result, as compared with the case that the number of terminal boxes is one (the case that all the first lead wires 44 are extracted from one place), the wiring length of the first lead wire 44 inside the housing 20 can be reduced and the number of first lead wires 44 to be bundled can be reduced, so the wiring space can be reduced. Moreover, because the number of first lead wires 44 introduced into one terminal box can be reduced, the terminal boxes 50L, 50R and the connecting parts 27L, 27R can be also miniaturized. Accordingly, the multiple winding structure of the rotating electric machine 10 allows the capacity to be increased and at the same time the size of the rotating electric machine 10 to be reduced.

Moreover, in this embodiment, in particular the terminal boxes 50L, 50R are installed on the both sides of the housing 20 via the connecting parts 27L, 27R in a direction perpendicular to the rotational axis direction, and the first lead wire 44 is introduced into a terminal box, among two terminal boxes 50L, 50R, where the distance between the coil end part 43 of the electrically connected winding 42 and the connecting parts 27L, 27R is shorter.

As a result, the effect of reducing the wiring length of the first lead wire 44 inside the housing 20 can be further increased. Moreover, the arrangement of two terminal boxes 50L, 50R on both the right and left sides of the housing 20 allows the weight balance of the whole rotating electric machine 10 to be improved and the vibration and/or noise to be reduced.

Moreover, in this embodiment, in particular the rotating electric machine 10 includes: a plurality of thermistors 45 for detecting a temperature change of the winding 42; and a plurality of second lead wires 46, two of which are electrically connected to each of a plurality of thermistors 45, respectively. Here, the second lead wire 46 is introduced into a terminal box, among two terminal boxes 50L, 50R, where the distance between the electrically connected thermistor 45 and the connecting parts 27L, 27R is shorter. As a result, the following effects are obtained.

That is, the provision of the thermistor 45 for detecting a temperature change of the winding 42 allows for a measure to issue an alarm when the winding 42 becomes in an overheat state, for example. As a result, the overload protection function of the rotating electric machine 10 can be enhanced. Moreover, because the wiring length of the second lead wire 46 inside the housing 20 can be reduced and the number of second lead wires 46 to be bundled can be reduced, the wiring space can be reduced. Accordingly, the rotating electric machine 10 can be miniaturized.

Moreover, in this embodiment, in particular the rotating electric machine 10 includes: a plurality of thermostats 47A for detecting a temperature change of the winding 42 and shutting the conduction thereof in the case that a predetermined condition is met, the plurality of thermostats 47A being connected in series with each other; and two third lead wires 48 electrically connected to the plurality of thermostats 47A. Here, two third lead wires 48 are introduced into either one of the terminal boxes 50L, 50R.

As a result, a terminal box into which the third lead wire 48 is introduced can be arbitrarily selected. As the result, it is possible to change the extraction position of the third lead wire 48, for example, depending on the use environment or the like of the rotating electric machine 10. Accordingly, it is possible to improve the design freedom of the rotating electric machine 10 and also possible to flexibly correspond to a user's need.

Moreover, in this embodiment, in particular the rotating electric machine 10 includes the shaft 31 and a plurality of bearings 18, 19 which rotatably support the shaft 31. Here, the plurality of bearings 18, 19 include the opposite load side bearing 19, at least a part of which are arranged so as to be located inside the coil end part 43 of the winding 42 in the radial direction.

As a result, at least a part of the opposite load side bearing 19 and the coil end part 43 of the winding 42 can be arranged so as to overlap with each other in the axial direction, so the axial dimension of the rotating electric machine 10 can be reduced.

Moreover, in this embodiment, in particular the terminal box 50L (50R) includes a plurality of terminal blocks 55L (55R) to which a plurality of first lead wires 44 are connected for each system. Here, at least some of a plurality of terminal blocks 55L (55R) are arranged so that the positions thereof in the rotational axis direction inside the terminal box 50L (50R) shift by a specified amount.

As a result, it is possible to arrange a plurality of terminal blocks 55L (55R) so as to be alternately positioned in the rotational axis direction. Accordingly, as compared with a case where a plurality of terminal blocks 55L (55R) are arranged so as to be located at an identical position in the rotational axis direction, the height dimension of the terminal box 50L (50R) can be reduced. Moreover, isolation between respective systems can be secured and the wiring workability with respect to each terminal block 55L (55R) can be improved.

6. Variant

Note that, the disclosed embodiment is not limited to the one described above, but various variants are possible without departing from the spirit and technical ideas thereof.

In the above, a case has been described, where a plurality of first lead wires 44 are wired on the opposite load side (back side) of the coil end part 43 of the winding 42 inside the opposite load side bracket 17 (housing 20), but the arrangement of the first lead wire 44 is not limited thereto. For example, the first lead wire 44 may be arranged radially outward of the coil end part 43. An embodiment of the wiring configuration of a plurality of first lead wires 44 in this variant is illustrated in FIG. 10. In FIG. 10, the same reference sign as the reference sign of FIG. 2 designates an identical member.

As illustrated in FIG. 10, in this variant a plurality of first lead wires 44 are wired outside the coil end part 43 of the winding 42 in the radial direction with respect to the rotational axis AX. As a result, the wiring space of the first lead wire 44 and the coil end part 43 of the winding 42 can be arranged so as to overlap with each other in the axial direction, so the axial dimension of the rotating electric machine 10 can be further reduced.

It is noted that if terms "vertical," "parallel," "plane," etc. are used in the above description, these terms are not used in the exact meanings thereof. Specifically, these terms "vertical," "parallel," and "plane" allow tolerances and errors in design and producing and have meanings of "approximately vertical," "approximately parallel," and "approximately plane."

It is noted that if terms "same," "equal," "different," etc. in relation to a dimension, a size, a shape and a position of the appearance are used in the above description, these terms are not used in the exact meaning thereof. Specifically, these terms "same," "equal," and "different" allow tolerances and errors in design and producing and have meanings of "approximately the same," "approximately equal," and "approximately different."

Techniques by the embodiment and each modified example may be appropriately combined and utilized in addition to the examples having already described above. Although exemplification is not performed one by one, the embodiment and each modified example are carried out by various changes being applied thereto without departing from the technical idea of the present disclosure.

What is claimed is:

1. A rotating electric machine comprising:
a housing;
a stator core housed in the housing;
a plurality of systems of winding groups arranged in the stator core and electrically connected to a plurality of power conversion devices, one system of winding group being defined as a plurality of windings electrically connected to one power conversion device;
a plurality of first lead wires electrically connected to the plurality of systems of winding groups and wired inside the housing; and
a plurality of terminal boxes arranged at a plurality of places in an outer circumference of the housing, the plurality of first lead wires being distributed in a unit of the system of winding group and introduced into the plurality of terminal boxes,
wherein the plurality of terminal boxes comprise two terminal boxes installed on both sides of the housing via a connecting part in a direction perpendicular to a rotational axis direction, and
wherein the first lead wire is introduced into one terminal box among the two terminal boxes, a distance between a coil end part of the winding electrically connected to the first lead wire and the connecting part of the one terminal box is shorter than a distance between the coil end part of the winding and the connecting part of another terminal box.

2. The rotating electric machine according to claim 1, further comprising:
a plurality of second temperature sensors configured to detect a temperature change of the winding and shut a conduction of the second temperature sensor in a case that a predetermined condition is met, the plurality of second temperature sensors being connected in series with each other; and
two third lead wires electrically connected to the plurality of second temperature sensors,
wherein the two third lead wires are introduced into either one of the plurality of terminal boxes.

3. The rotating electric machine according to claim 1, further comprising:
a shaft; and
a plurality of bearings which rotatably support the shaft,
wherein the plurality of bearings comprises at least one bearing, at least a part of the at least one bearing is arranged so as to be located inside a coil end part of the winding in a radial direction with respect to a rotational axis.

4. The rotating electric machine according to claim 1, wherein the terminal box comprises a plurality of terminal blocks to which the plurality of first lead wires are connected for each of the systems of winding groups, and
wherein at least some of the plurality of terminal blocks are arranged such that positions of the at least some of terminal blocks in a rotational axis direction inside the terminal box shifts by a specified amount.

5. The rotating electric machine according to claim 1, wherein the plurality of first lead wires are wired outside a coil end part of the winding in a radial direction with respect to a rotational axis.

6. The rotating electric machine according to claim 1, further comprising:
a plurality of first temperature sensors configured to detect a temperature change of the winding; and
a plurality of second lead wires, two of the plurality of second lead wires being electrically connected to each of the plurality of first temperature sensors, respectively,
wherein the second lead wire is introduced into one terminal box among the two terminal boxes, a distance between the first temperature sensor electrically connected to the second lead wire and the connecting part of the one terminal box is shorter than a distance between the first temperature sensor and the connecting part of another terminal box.

7. The rotating electric machine according to claim 6, further comprising:
a shaft; and
a plurality of bearings which rotatably support the shaft,
wherein the plurality of bearings comprises at least one bearing, at least a part of the at least one bearing is arranged so as to be located inside the coil end part of the winding in a radial direction with respect to the rotational axis.

8. The rotating electric machine according to claim 6, wherein the terminal box comprises a plurality of terminal blocks to which the plurality of first lead wires are connected for each of the systems of winding groups, and wherein at least some of the plurality of terminal blocks are arranged such that positions of the at least some of terminal blocks in the rotational axis direction inside the terminal box shifts by a specified amount.

9. The rotating electric machine according to claim 6, wherein the plurality of first lead wires are wired outside the coil end part of the winding in a radial direction with respect to the rotational axis.

10. The rotating electric machine according to claim 6, further comprising:
a plurality of second temperature sensors configured to detect a temperature change of the winding and shut a conduction of the second temperature sensor in a case that a predetermined condition is met, the plurality of second temperature sensors being connected in series with each other; and
two third lead wires electrically connected to the plurality of second temperature sensors,
wherein the two third lead wires are introduced into either one of the plurality of terminal boxes.

11. The rotating electric machine according to claim 10, wherein the terminal box comprises a plurality of terminal blocks to which the plurality of first lead wires are connected for each of the systems of winding groups, and wherein at least some of the plurality of terminal blocks are arranged such that positions of the at least some of terminal blocks in the rotational axis direction inside the terminal box shifts by a specified amount.

12. The rotating electric machine according to claim 10, further comprising:
a shaft; and
a plurality of bearings which rotatably support the shaft, wherein the plurality of bearings comprises at least one bearing, at least a part of the at least one bearing is arranged so as to be located inside the coil end part of the winding in a radial direction with respect to a rotational axis.

13. The rotating electric machine according to claim 12, wherein the terminal box comprises a plurality of terminal blocks to which the plurality of first lead wires are connected for each of the systems of winding groups, and wherein at least some of the plurality of terminal blocks are arranged such that positions of the at least some of terminal blocks in the rotational axis direction inside the terminal box shifts by a specified amount.

14. The rotating electric machine according to claim 13, wherein the plurality of first lead wires are wired outside the coil end part of the winding in the radial direction with respect to the rotational axis.

15. A drive system for a rotating electric machine, comprising:
the rotating electric machine, the rotating electric machine comprising:
a housing;
a stator core housed in the housing;
a plurality of systems of winding groups arranged in the stator core and electrically connected to a plurality of power conversion devices, one system of winding group being defined as a plurality of windings electrically connected to one power conversion device;
a plurality of first lead wires electrically connected to the plurality of systems of winding groups and wired inside the housing; and
a plurality of terminal boxes arranged at a plurality of places in an outer circumference of the housing, the plurality of first lead wires being distributed in a unit of the system of winding group and introduced into the plurality of terminal boxes,
wherein the plurality of terminal boxes comprise two terminal boxes installed on both sides of the housing via a connecting part in a direction perpendicular to a rotational axis direction, and
wherein the first lead wire is introduced into one terminal box among the two terminal boxes, a distance between a coil end part of the winding electrically connected to the first lead wire and the connecting part of the one terminal box is shorter than a distance between the coil end part of the winding and the connecting part of another terminal box,
a plurality of power conversion devices electrically connected to the rotating electric machine; and
a control device configured to control the plurality of power conversion devices.

16. A rotating electric machine comprising:
a housing;
a stator core housed in the housing;
a plurality of systems of winding groups arranged in the stator core and electrically connected to a plurality of power conversion devices, one system of winding group being defined as a plurality of windings electrically connected to one power conversion device; and
means for distributing, in a unit of the system of winding group, a plurality of first lead wires wired inside the housing and electrically connected to the plurality of systems of winding groups, and for leading out the plurality of first lead wires to a plurality of terminal boxes outside of the housing,
wherein the plurality of terminal boxes comprise two terminal boxes installed on both sides of the housing via a connecting part in a direction perpendicular to a rotational axis direction, and
wherein the first lead wire is introduced into one terminal box among the two terminal boxes, a distance between a coil end part of the winding electrically connected to the first lead wire and the connecting part of the one terminal box is shorter than a distance between the coil end part of the winding and the connecting part of another terminal box.

* * * * *